US 6,547,190 B1

(12) United States Patent
Thompson et al.

(10) Patent No.: US 6,547,190 B1
(45) Date of Patent: Apr. 15, 2003

(54) APPLICATION OF CARBON FIBER MESH FOR SPACE AND AIRBORNE PLATFORM APPLICATIONS

(75) Inventors: Brian D. Thompson, Palos Verdes, CA (US); Wah L. Lim, Santa Ana, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 10/139,934

(22) Filed: May 6, 2002

Related U.S. Application Data

(63) Continuation of application No. 09/654,924, filed on Sep. 5, 2000.

(51) Int. Cl.$^7$ ................................................. H01L 25/00
(52) U.S. Cl. ........................ 244/173; 136/244; 136/292; 136/245; 428/292.1; 428/293.4; 428/317.9
(58) Field of Search .......................... 244/173; 136/243, 136/244, 245, 291, 292; 428/98, 221, 292.1, 293.4, 304.4, 317.9

(56) References Cited

U.S. PATENT DOCUMENTS

| | | | |
|---|---|---|---|
| 4,141,764 A | 2/1979 | Authier et al. | 148/174 |
| 4,542,257 A | 9/1985 | Fraser et al. | 136/251 |
| 5,264,285 A | 11/1993 | Dougherty | 428/427 |
| 5,298,085 A * | 3/1994 | Harvey et al. | 136/244 |
| 5,567,500 A * | 10/1996 | Marshall et al. | 428/116 |
| 5,762,720 A | 6/1998 | Hanoka et al. | 136/251 |
| 5,810,284 A | 9/1998 | Hibbs et al. | 244/13 |
| 6,224,016 B1 | 5/2001 | Lee et al. | 244/30 |
| 6,260,808 B1 * | 7/2001 | Bodeau et al. | 136/292 |
| 2002/0005457 A1 | 1/2002 | Lee et al. | 244/30 |

OTHER PUBLICATIONS

Yokosuka Research Park, "The First Stratospheric Platform Systems Workshop", pp. 1–216, May 12–13, 1999.

* cited by examiner

*Primary Examiner*—J. Woodrow Eldred
(74) *Attorney, Agent, or Firm*—V. D. Duraiswamy; M. W. Sales

(57) ABSTRACT

A solar array including a carbon fiber mesh substrate is provided. The solar panels including a series of hybrid structures formed along the common and continuous substrate by sandwiching the substrate between a series of discontinuous upper and lower support layers. In order to construct the solar panels having such hybrid structure, a series of top support layers or upper face sheets is disposed on a upper surface of the substrate and between the folding sections. The solar cells are placed on top of the upper face sheets. Similarly, a series of lower support layers or lower face sheets are disposed on a bottom surface of the substrate and between the folding sections. The folding sections are the regions where the upper and lower face sheets discontinue and expose the underlying substrate. The solar array can be folded along the folding section when a bending force is applied over one of the hybrid structures.

33 Claims, 7 Drawing Sheets

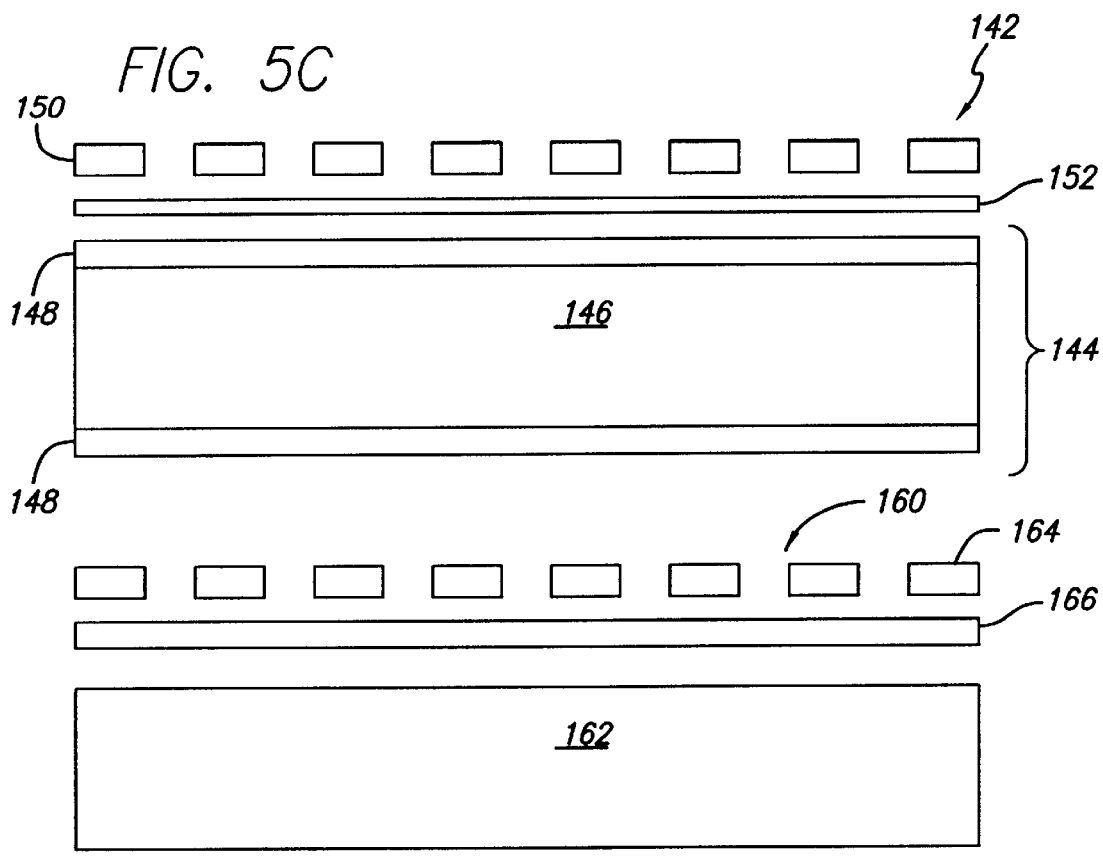
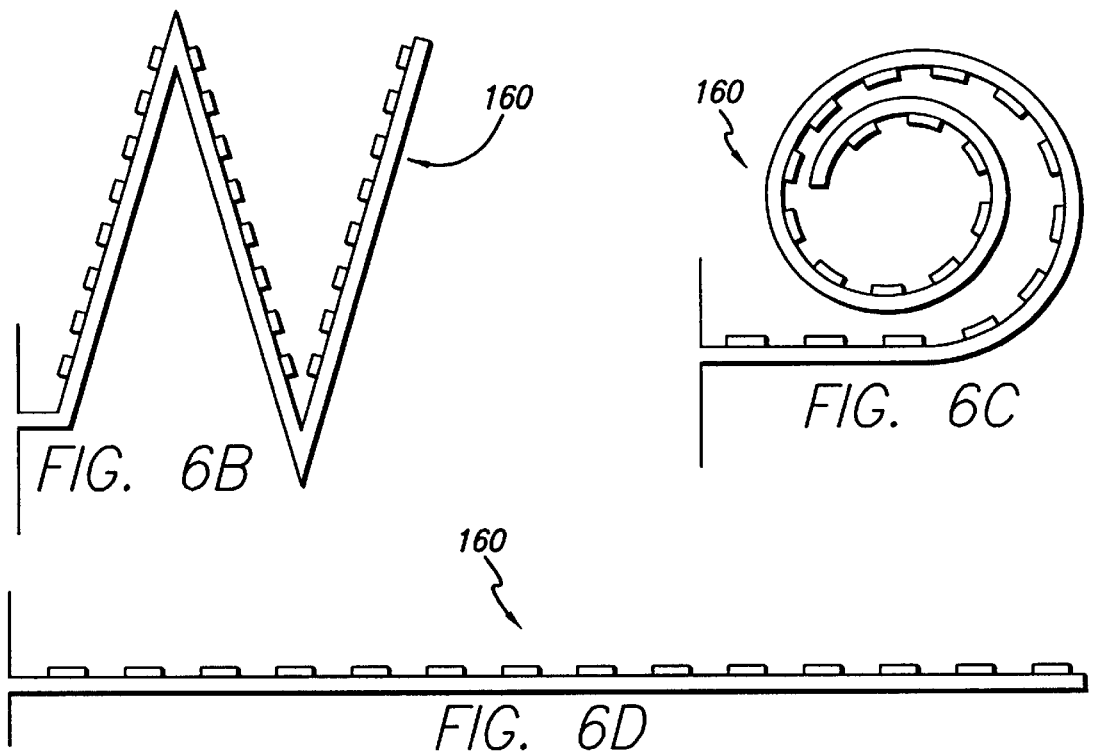

FIG. 8A
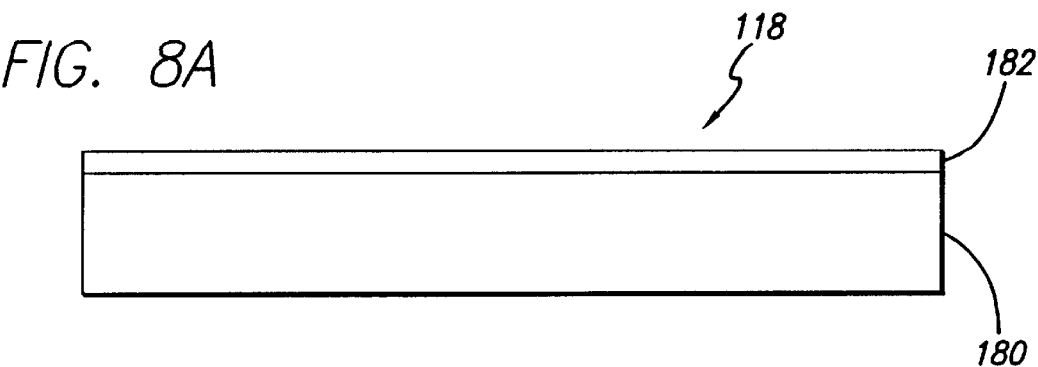
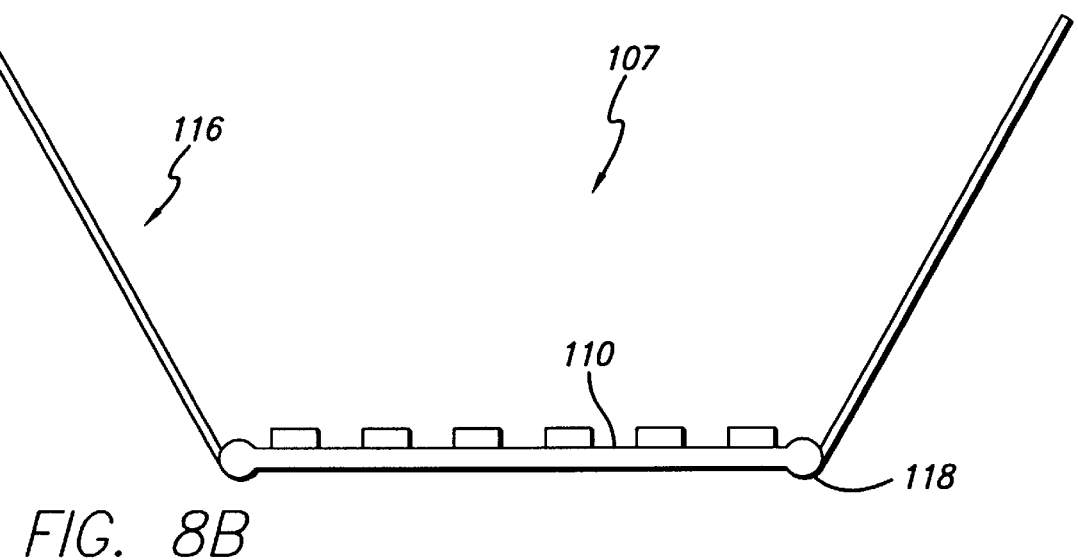
FIG. 8B
FIG. 8C
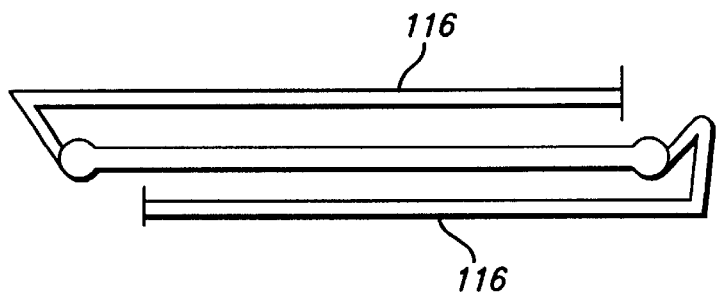

APPLICATION OF CARBON FIBER MESH FOR SPACE AND AIRBORNE PLATFORM APPLICATIONS

CROSS-REFERENCE TO RELATED APPLICATIONS

This application claims the benefit of and is a continuation of U.S. patent application bearing Ser. No. 09/654,924 filed Sep. 5, 2000 pending.

BACKGROUND OF THE INVENTION

1. Field of the Invention

The present invention generally relates to deployable structures such as solar arrays and, more particularly, to solar array support systems.

2. Description of the Related Art

In outer space applications, solar arrays are generally composed of a series of solar panels for generating electrical power for systems such as a spacecraft or the like. The conversion of solar energy into electrical energy through solar cells is an obvious choice for producing power for such systems. The solar arrays are typically designed in foldable configurations in which the solar panels, supporting solar cells, are hingeably connected edge to edge lengthwise by various attachment systems. Such solar arrays may also include reflectors to concentrate the solar light upon the solar arrays. Reflectors are attached to the solar panels widthwise to the opposite ends of each solar panel.

The solar arrays are generally mounted on deployment yokes so that they can be extended or retracted from the spacecraft. During the launch of the spacecraft, the solar arrays are put into a stowed configuration where the solar arrays are folded in zigzag fashion against the spacecraft. Once the spacecraft is in outer space, the solar arrays are deployed into an extended configuration where the solar panels and the reflectors are folded away into an operation position in which the solar cells face the sun.

Such solar arrays must be adequately designed to withstand the undesirable physical conditions of such space missions so that they can properly function throughout their life time. Such undesirable conditions are generally mechanical and thermal stresses occurring during the launching and during the operation of the solar arrays. In this respect, the solar panels supporting the solar cells must be designed to meet the certain thermal and mechanical stress and strain requirements so as to protect the solar cells on them. As the solar cells are made of silicon or gallium arsenide materials, they are brittle. In other words, the panels function as the mechanical and the thermal support of the solar arrays.

Currently, solar panels are constructed from aluminum honeycomb substrates. In such structures, the honeycomb substrates are covered with carbon fiber face sheets on upper and lower surfaces of the honeycomb substrates. The carbon fiber face sheets stiffen the honeycomb substrate to increase the strength and the rigidity of the solar panels in stowed or deployed configurations. However, such aluminum honeycomb base solar panels are heavy in the context of such space applications. Another drawback involves their deployment and stowing systems. Such solar arrays require complex deployment and stowing systems employing tension wires, springs, hinges and the like to facilitate the deployment and stowing of the solar arrays.

As can be seen, there is a need for light weight, high temperature resistant, stiff and resilient deployable structures such as solar arrays, reflectors, and thermal blankets.

SUMMARY OF THE INVENTION

The present invention provides a deployable structure, such as a solar array system, utilizing a carbon fiber mesh material as a substrate. Due to its light-weight and flexibility, substrates containing the carbon fiber mesh material can be applied, as an example, to deployable solar arrays and reflectors for air borne vehicles such as satellites for space based applications as well as to the solar arrays for use in stratospheric platforms of an air borne vehicle such as an airplane.

In one aspect of the present invention, a solar array comprises a mesh substrate and a plurality of solar cells disposed on a first surface of the mesh substrate. The mesh substrate is formed from a matrix of resilient fibers.

These and other features, aspects and advantages of the present invention will become better understood with reference to the following drawings, description and claims.

BRIEF DESCRIPTION OF THE DRAWINGS

FIG. 5C is a schematic cross sectional view of the solar panel using a carbon fiber mesh composite;

FIG. 6A is a cross sectional view of an embodiment of the solar array of the present invention;

FIGS. 6B–6D are schematic views illustrating deployed and stowed states of the solar array shown in FIG. 6A;

FIGS. 8A–8C are schematic views illustrating solar reflectors of the present invention.

DETAILED DESCRIPTION OF THE INVENTION

Although the present invention is described in the context of a solar array system utilizing a carbon fiber mesh material as a substrate, the scope of the invention is not so limited. Due to its light weight and flexibility, substrates containing the carbon fiber mesh material can be applied to deployable structures that support objects. What is meant by "deployable" is a structure that can be deployed for use and stowed for non-use. Accordingly, these deployable structures can include thermal blankets, solar arrays and reflectors for space and land based applications. In particular, the present invention can be applied to the solar arrays for use in air borne vehicles such as satellites and stratospheric platforms or airplanes. In such uses, the carbon fiber mesh material may be used in combination with other materials or laminates so as to enhance its applicability and versatility.

The carbon fiber mesh substrate of the present invention provides a material that is lighter and stiffer than the conventional substrates employing aluminum honeycomb substrates or cores. Further, the carbon fiber mesh material of the present invention may withstand very high operation temperatures, as high as 2500° C. This property significantly alleviates the localized heating problems in solar arrays. Adding to the aforementioned advantages, the carbon fiber mesh material of the present invention is very resilient to bending. If the carbon fiber mesh material is folded into a compact shape, when released, it will spring back to its original shape without leaving any fold line behind. The present invention advantageously employs this property of the carbon fiber mesh to construct deployable solar arrays and solar reflectors.

Figure 1:
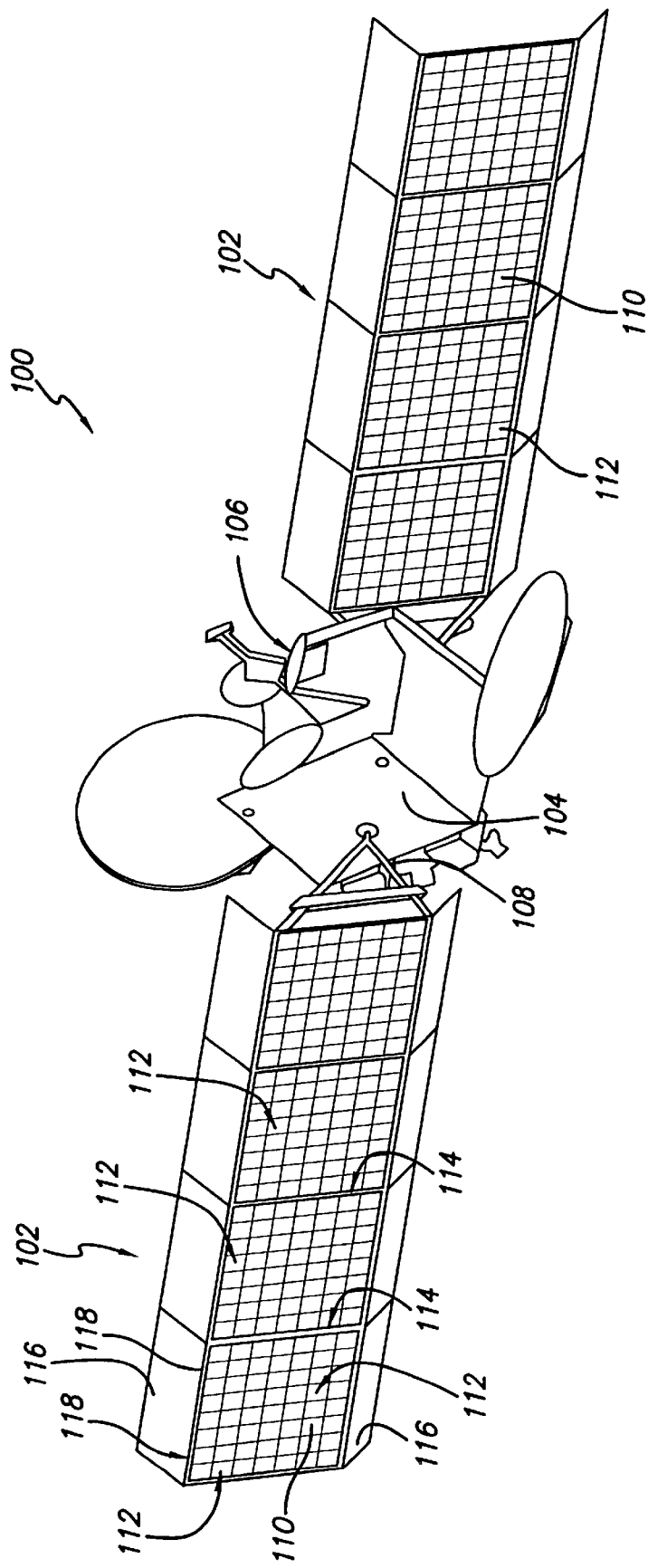
FIG. 1 is a perspective view of a satellite using solar arrays according to an embodiment of the present invention.

Reference will now be made to the drawings wherein like numerals refer to like parts throughout. FIG. 1 exemplifies a spacecraft 100 comprising a number of solar arrays 102 of the present invention in a fully deployed configuration. The solar arrays may be mounted on a side-wall 104 of a body 106 of the spacecraft 100 using yokes 108. In this embodiment, although it is possible to use a multiplicity of the solar arrays, for the purpose of clarity, only two of the solar arrays 102 are shown on the spacecraft body 106. It is within the scope of this invention that the solar arrays 102 of the present invention may be used with any suitable structure including, but not limited to, a stratospheric platform, satellite, space station or land based applications. The solar array 102 of the present invention may comprise a series of solar panels 110 comprising a plurality of solar cells 112 on an upper side of the solar arrays 102. Solar panels 110 are separated from one other at a folding section 114. As will be described below, the folding sections 114 allow panels 110 to be folded relative to each other in a zigzag fashion when the solar array is stowed. The solar array 102 of the present embodiment may also employ solar reflectors to increase the power output of the solar cells. In this embodiment, a pair of solar reflectors 116 may be connected to each solar panel 110 using rigid connectors 118 as in the manner shown in FIG. 1.

Figure 2A:
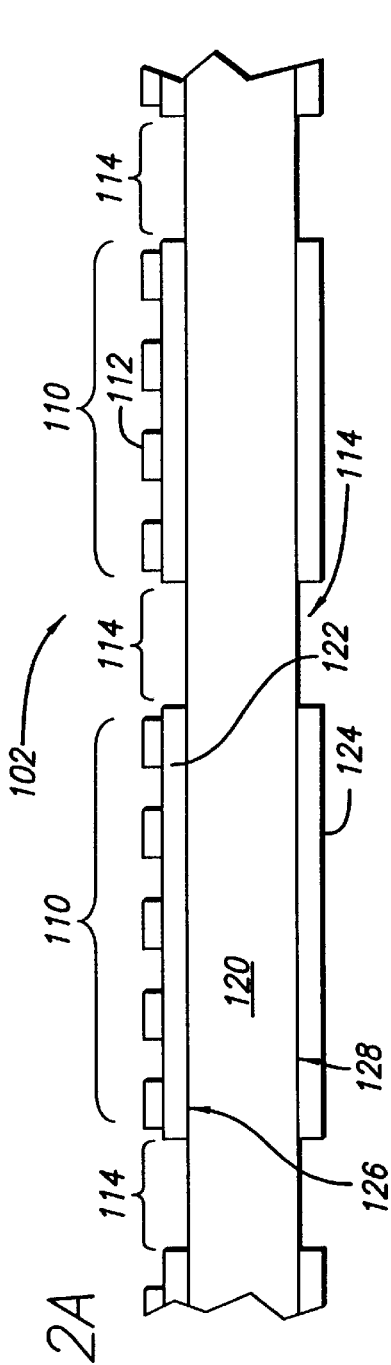
FIGS. 2A–2B are schematic cross-sectional views of the solar arrays shown in FIG. 1.

In FIG. 2A, in an exemplary cross-sectional view of the solar array 102, a number of solar panels 110 are shown separated by the folding sections 114. The solar panels 110 may be comprised of a series of hybrid structures formed along a common and continuous substrate 120 by sandwiching the substrate 120 between a series of discontinuous upper and lower support layers 122 and 124. In order to construct the solar panels having such hybrid structure, a series of upper support layers 122 or upper face sheets is disposed on a top surface 126 of the substrate 120 and between the folding sections 114. The solar cells 112 may be placed on top of the upper face sheets 122. Similarly, a series of lower support layers 124 or lower face sheets are disposed on a bottom surface 128 of the substrate 120 and between the folding sections 114. At this point, the folding sections 114 can be further described as the regions where the upper and lower face sheets 122 and 124 discontinue and expose the underlying substrate 120. As will be described more fully below, in this embodiment, the material of the substrate 120 is preferably less stiff than the hybrid structure of the solar panels 110 which has the substrate 120 interposed between the upper and the lower face sheets 122 and 124.

Figure 2B:
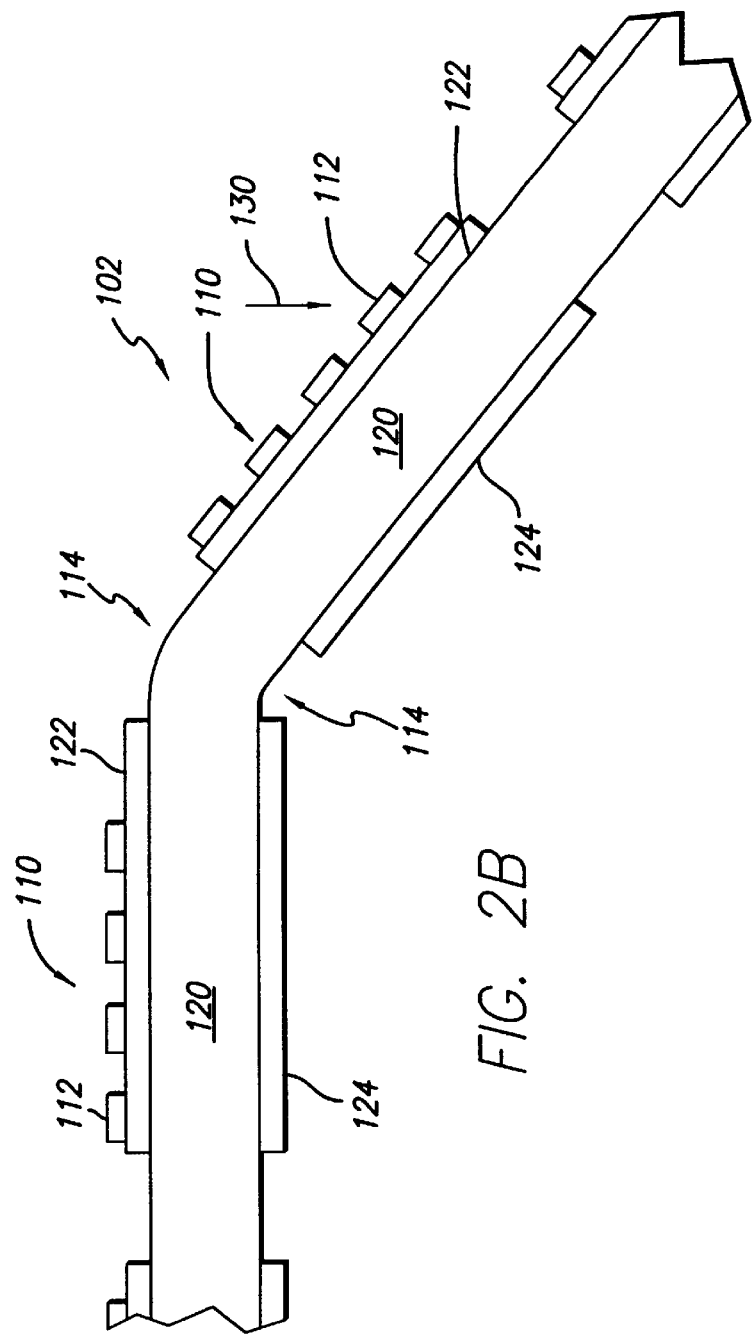

Therefore, as illustrated in FIG. 2B, the solar array 102 can be folded along the folding section 114 when a bending force is applied, for example, in the direction of the arrow 130 and over one of the stiffened solar panels 110. However, due to the material properties of the substrate 120, when the bending force is removed, the solar array springs back to its straight configuration which is shown in FIG. 2A. In other words, the bending force elastically deforms the folding section under the deforming force, i.e., bending force in this case. Since the deformation of the substrate material, which is exposed in the folding section 114, is elastic, i.e., temporary or non-plastic deformation, when the force is removed the folding section returns to its original shape thereby deploying the solar array 102 without needing prior art hinge systems, springs and other deployment equipment. The dimensions of the substrate 120 depend on the application. Typically, the folding section 114 is approximately 3 to 4 times the thickness of the substrate.

Figure 3A:
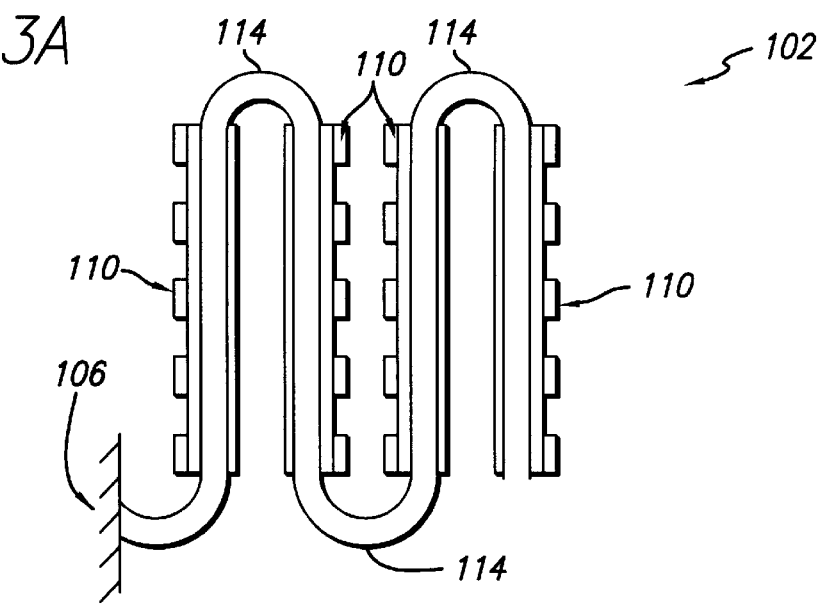
FIG. 3A is a schematic view showing the solar array of FIG. 2A in a fully retracted state.
Figure 3B:
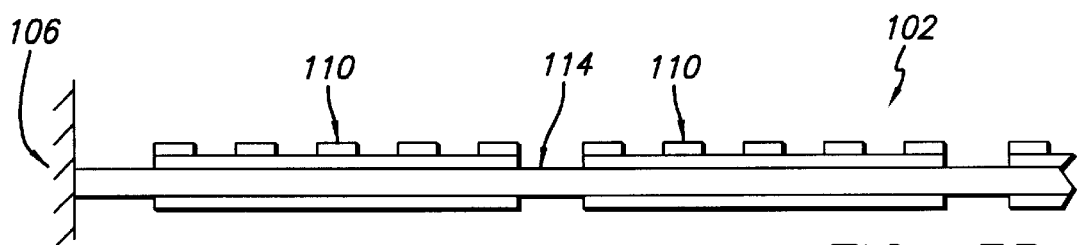
FIG. 3B is a schematic view showing the solar array of FIG. 3A in a fully deployed state.

FIGS. 3A and 3B show an implementation of the present invention. In FIG. 3A, in a stowed configuration, the solar panels 110 of the solar array 102 are folded against the body 106 of the spacecraft 100 (shown in FIG. 1) in a zigzag fashion by folding them along the folding sections 114. In the stowed configuration, the solar panels 110 are folded into a compact structure and secured (tied down) against the spacecraft until the time of the deployment. The stiff structure of the solar panels 110 provides a rigid mounting base for the solar cells 112, which is less likely to deform and damage the solar cells. Once the spacecraft reaches the outer space orbit, as shown in FIG. 3B, the solar array 102 of the present invention is released and the solar panels 110 are fully extended into a deployed configuration.

Figure 4:
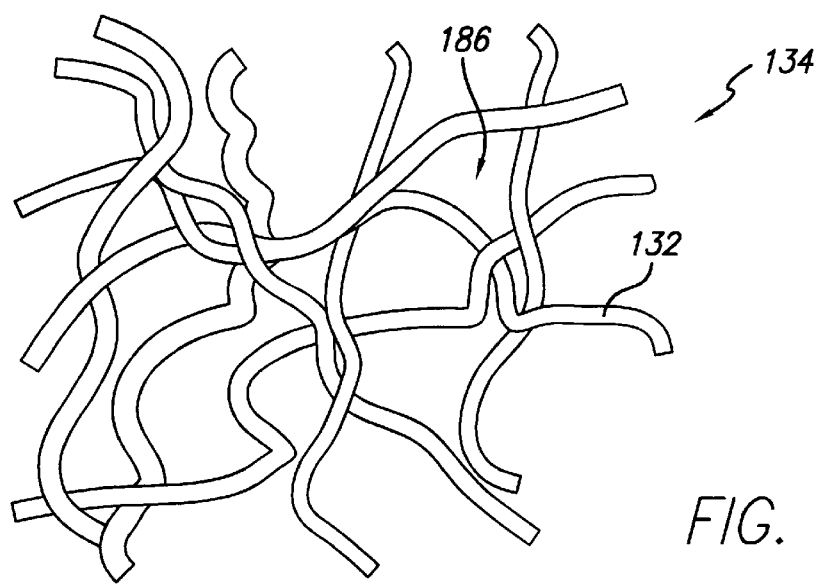
FIG. 4 is a magnified schematic illustration of the structure of the carbon fiber mesh substrate of this invention.

In the preferred embodiment, the substrate 120 comprises carbon fiber mesh material such as the one available from Energy Science Laboratory in San Diego, Calif. The carbon fiber mesh substrate material of the present invention is a substantially light-weight material, although it is stiff, resistant to temperature extremes and resilient to bending. As illustrated in FIG. 4, the carbon fiber mesh material of the present invention is comprised of a network of randomly oriented carbon fibers 132 linked into a matrix 134. The fiber matrix may also have a plurality of voids 186 formed between the carbon fibers 132. Accordingly, the substrate 120 material is distinguishable from the carbon fiber face sheets described above in the context of the prior art. Among other things, the substrate 120 material is not in a woven or unwoven mat form. Further, the substrate 120 material is neither composed of unidirectional or bidirectional fibers. As a result of this structure, the carbon fiber mesh material of the present invention may have a mass of approximately 3 grams per square meter. Due to its carbon content (carbon is a refractory material), the carbon fiber mesh material can tolerate temperatures as high as 2500° C. This property of the carbon fiber mesh protects the solar arrays from the harmful effects of localized heating occurring during the operation of the solar arrays.

As previously mentioned, the carbon fiber mesh material can be folded under a bending force, but when the force is removed, the material recovers to its original shape without leaving a fold line. In this embodiment, the face sheets 122 and 124 may preferably be carbon fiber mats. Alternatively, Kevlar™ mats can also be used. The carbon fiber mats are generally reinforced carbon fiber composites impregnated with epoxy. The orientation of the carbon fibers in the mat is controlled so as to provide maximum possible tensile strength in a given direction. As will be described below, multiple layers of face sheets can be used with different carbon fiber orientations to derive stiffness to bending along different axes.

Figure 5A:
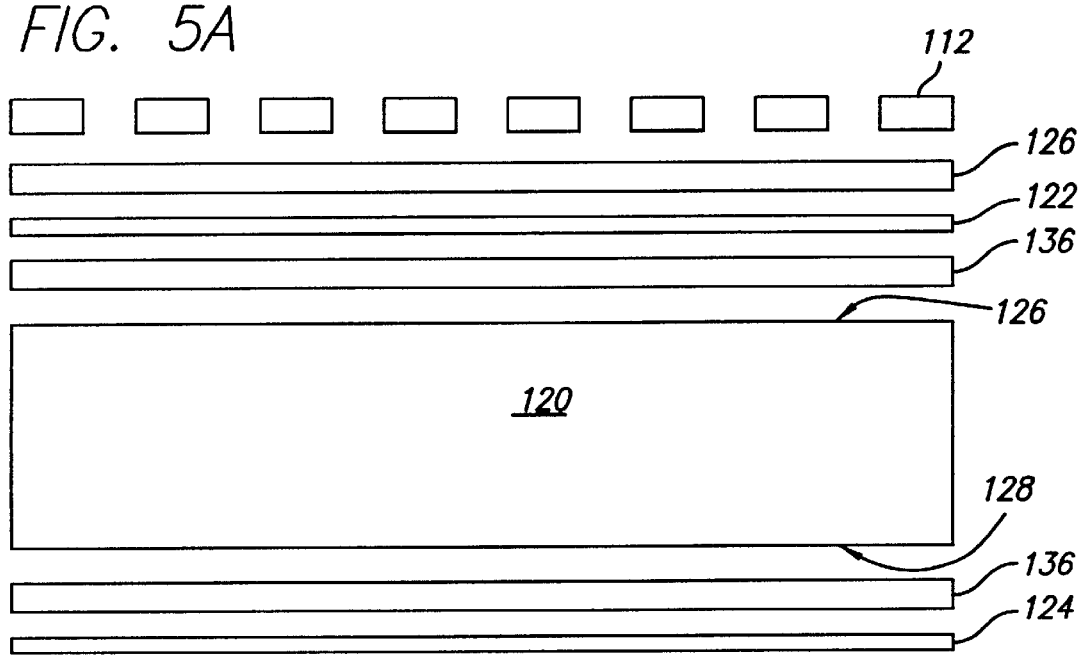
FIG. 5A is a schematic cross sectional view of a solar panel according to an embodiment of the present invention.

In accordance with the principles of the present invention, the solar panels 110 of the solar arrays may be fabricated in various alternative ways. As illustrated in FIG. 5A, in order to form the above mentioned hybrid panel structure, the upper and lower carbon fiber face-sheets 122 and 124 are bonded over the top and bottom surfaces 126 and 128 of the carbon mesh substrate 120 using a bonding material 136. The solar cells may be bonded to the upper face sheet 122 using the bonding material 136. In this embodiment a preferred bonding material is epoxy. As previously mentioned, the face sheets 122 and 124 stiffen the substrate in the hybrid structure of the solar panels 110.

Figure 5B:
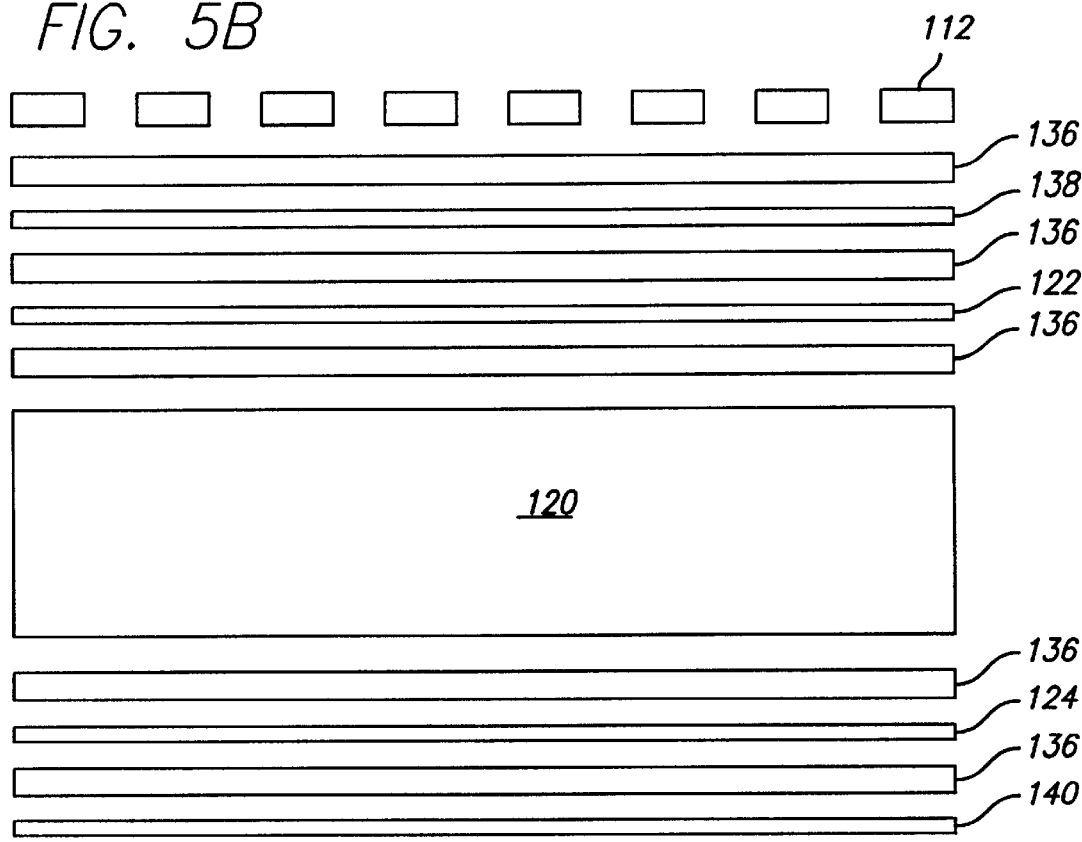
FIG. 5B is a schematic cross sectional view of a solar panel according to another embodiment of the present invention.

FIG. 5B shows another embodiment of forming the hybrid structure of the solar panels using multiple face sheets. In this embodiment, after bonding the upper and lower face sheets 122 and 126 to the carbon fiber mesh substrate 120, face sheets 138 and 140 are bonded to the face sheets 122 and 124 respectively. The solar cells 112 are bonded to the face sheet 138 using the bonding material 136. As previously mentioned, the use of multiple layers of face sheets increases the stiffness of the solar panels.

As shown in FIG. 5C, in another embodiment, a solar panel 142 may comprise a laminated composite structure 144 or carbon fiber mesh composite comprising a carbon fiber mesh substrate 146 interposed between the carbon fiber mats 148. Solar cells 150 are bonded to a top side of the carbon fiber mesh composite 144 using a bonding material 152 such as those used in the previous embodiments. In this embodiment, it is within the scope of the present invention that the entire solar array may be formed from the carbon fiber mesh composite 144 without having individual solar panels 142.

As illustrated in FIGS. 6A–6D, for various solar array applications, the stiffness of the carbon fiber mesh material can be sufficient without the use of additional face sheet materials. One such application would be an array composed of amorphous silicon cells. Since these cells are thinner and more flexible than conventional solar cells, the carbon fiber mesh alone can provide a sufficiently stiff substrate. As shown in FIG. 6A, a solar array 160 may comprise a carbon fiber mesh substrate 162 and solar cells 164 bonded on top of the substrate 162 using a bonding material 166. The bonding material 162 is the same bonding material used in the previous embodiments. FIGS. 6B and 6C show two possible stowing configurations for the solar array 160, a zigzag and a roll configuration respectively. As shown in FIG. 6D, when deployed, the solar array 160 extends into its original shape without having any fold or fatigue line.

Figure 7A:
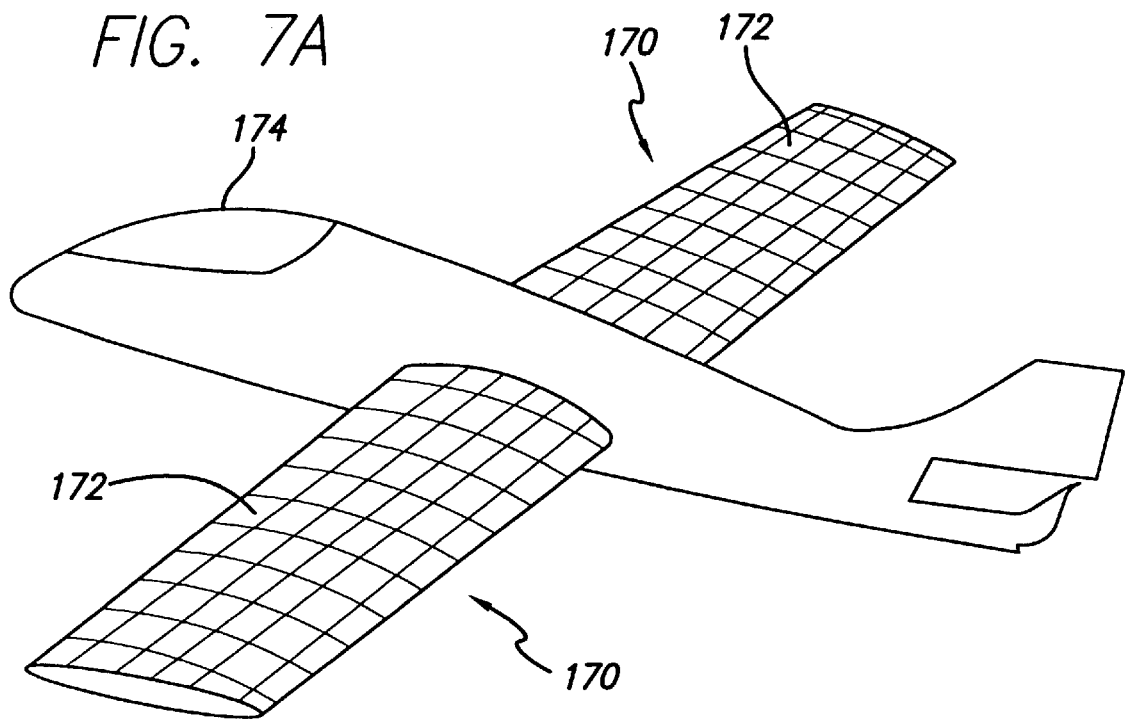
FIGS. 7A–7B are schematic views illustrating stratospheric platforms using an embodiment of the solar array of the present invention.
Figure 7B:
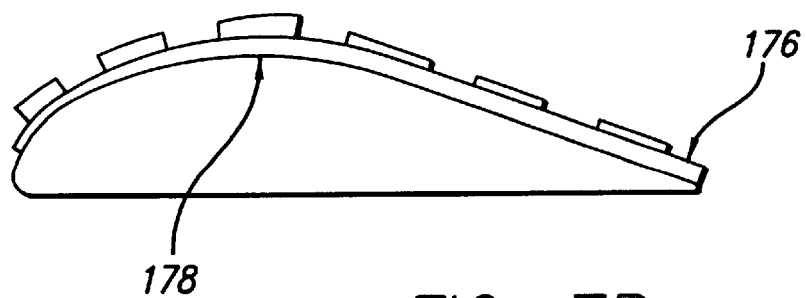

As shown in FIGS. 7A and 7B, a stratospheric platform 170 may comprise a number of solar arrays 172 to supply solar energy to an airplane 174. In this embodiment, the stratospheric platform 170 may be comprised of the wings of the airplane 174. As shown in FIG. 7B, the solar array 172 comprising a solar array with the laminated composite structure 144 described in FIG. 5C, or the solar array structure 160 described in FIG. 6A can be applied over an upper skin 178 of the wing 170. The lower mass and the stiffness properties of the carbon fiber mesh material can allow overall reduction in the mass of the wing.

The solar reflectors 116 shown in FIG. 1 can be also fabricated using carbon fiber mesh material. As shown in FIG. 1, the solar reflectors are attached to solar panels 110 of the solar array 102 using the rigid connectors 118. Solar reflectors concentrate additional light onto the solar cells to increase the power output of the solar array. In the prior art, the reflectors are held in tension by a system of springs and rods and attached to the solar panels using hinge systems. The deployment of such prior art systems is difficult to implement.

As illustrated in FIG. 8A, in one embodiment, the reflectors 116 may be comprised of a carbon fiber mesh substrate 180 having a reflective layer 182 on top of the substrate 180. The reflective layer may comprise vapor deposited aluminum (VDA) Kapton™ material. As shown in FIG. 8B, in a fully deployed configuration, the reflectors 116 are attached to the solar panels 110 using rigid connectors 118, thereby eliminating prior art hinges and tension wires. As shown in FIG. 8C, the solar reflectors 116 may be stowed by bending the reflectors toward the top and the bottom of the solar array 102. The tendency of the carbon fiber mesh to spring back to its original shape makes it possible to rigidly mount the reflector to the solar array and stow the reflector by bending the carbon fiber mesh reflectors.

It should be understood, of course, that the foregoing relates to preferred embodiments of the invention and that modifications may be made without departing from the spirit and scope of the invention as set forth in the following claims.

We claim:

1. A solar array comprising:

a mesh substrate, the mesh substrate being formed from a matrix of randomly oriented resilient fibers, the matrix having a plurality of voids between the resilient fibers; and a plurality of solar cells disposed on a first surface of the mesh substrate.

2. A solar array comprising:

a mesh substrate;

said mesh substrate consisting essentially of a matrix of randomly oriented resilient fibers and having a first surface, the matrix having a plurality of voids between the fibers; and a plurality of solar cells disposed on the first surface of the mesh substrate.

3. The solar array of claim 2, wherein said mesh substrate is characterized by a mass of approximately 3 grams per square meter.

4. A solar array comprising:

a mesh substrate;

said mesh substrate consisting essentially of a matrix of carbon fibers;

said carbon fibers being randomly oriented in said matrix;

a plurality of voids between said carbon fibers; and a plurality of solar cells disposed on said mesh substrate.

5. The solar array of claim 4, wherein said mesh substrate is characterized by a mass of approximately 3 grams per square meter.

6. The solar array of claim 4, further comprising a support layer interposed between said mesh substrate and said plurality of solar cells.

7. A solar array comprising:

a mesh substrate;

said mesh substrate consisting essentially of a matrix of resilient carbon fibers;

said matrix being characterized by a plurality of voids between said resilient carbon fibers;

said carbon fibers being randomly oriented in said matrix; and a plurality of solar cells disposed on a first surface of said mesh substrate.

8. The solar array of claim 2, wherein a second surface of said mesh substrate, opposite said first surface, is bonded to an exterior portion of a stratospheric platform.

9. The solar array of claim 2, wherein a second surface of said mesh substrate, opposite said first surface, is bonded to an exterior portion of a spacecraft.

10. The solar array of claim 2, wherein a second surface of said mesh substrate, opposite said first surface, is bonded to an exterior portion of a land bas ed structure.

11. The solar array of claim 4, wherein a second surface of said mesh substrate, opposite said first surface, is bonded to an exterior portion of a stratospheric platform.

12. The solar array of claim 4, wherein a second surface of said mesh substrate, opposite said first surface, is bonded to an exterior portion of a spacecraft.

13. The solar array of claim 4, wherein a second surface of said mesh substrate, opposite said first surface, is bonded to an exterior portion of a land based structure.

14. A stratospheric platform having an exterior surface comprising:
   a solar array comprising a mesh substrate formed from a matrix of randomly oriented resilient fibers having a plurality of voids therebetween, and a plurality of solar cells disposed on a first surface of said mesh substrate;
   wherein said solar array is attached to said exterior surface.

15. The stratospheric platform according to claim 14, wherein said resilient fibers are carbon fibers.

16. The stratospheric platform according to claim 14, wherein said mesh substrate is characterized by a mass of approximately 3 grams per square meter.

17. A spacecraft having an exterior surface comprising:
   a solar array comprising a mesh substrate formed from a matrix of randomly oriented resilient fibers having a plurality of voids therebetween, and a plurality of solar cells disposed on a first surface of said mesh substrate;
   wherein said solar array is attached to said exterior surface.

18. The spacecraft according to claim 17, wherein said resilient fibers are carbon fibers.

19. The spacecraft according to claim 17, wherein said mesh substrate is characterized by a mass of approximately 3 grams per square meter.

20. A land-based vehicle having an exterior surface comprising:
   a solar array attached to said exterior surface, said solar array comprising a mesh substrate formed from a matrix of randomly oriented resilient fibers having a plurality of voids therebetween, and a plurality of solar cells disposed on a first surface of said mesh substrate.

21. The land-based vehicle according to claim 20, wherein said resilient fibers are carbon fibers.

22. The land-based vehicle according to claim 20, wherein said mesh substrate is characterized by a mass of approximately 3 grams per square meter.

23. A solar array comprising:
   a mesh substrate having a mass of about 3 grams per square meter;
   said mesh substrate having a matrix of resilient carbon fibers;
   said matrix being characterized by a plurality of voids between said resilient carbon fibers;
   said carbon fibers being randomly oriented in said matrix; and
   a plurality of solar cells disposed on a first surface of said mesh substrate.

24. The solar array of claim 23, wherein a second surface of said mesh substrate, opposite said first surface, is bonded to an exterior portion of a stratospheric platform.

25. The solar array of claim 23, wherein a second surface of said mesh substrate, opposite said first surface, is bonded to an exterior portion of a spacecraft.

26. The solar array of claim 23, wherein a second surface of said mesh substrate, opposite said first surface, is bonded to an exterior portion of a land based structure.

27. A method for making a solar array comprising:
   bonding a plurality of solar cells to a top surface of a carbon fiber mesh substrate;
   wherein said carbon fiber mesh substrate includes a matrix of randomly oriented resilient carbon fibers with a plurality of voids between said resilient carbon fibers.

28. The method according to claim 27, further comprising bonding a first upper carbon fiber face sheet on said top surface of said carbon fiber mesh substrate, between said plurality of solar cells and said carbon fiber mesh substrate.

29. The method according to claim 28, further comprising bonding a second upper carbon fiber face sheet between said plurality of solar cells and said upper first carbon fiber face sheet.

30. The method according to claim 29, further comprising bonding a first lower carbon fiber face sheet on a bottom surface, opposite said top surface, of said carbon fiber mesh substrate.

31. The method according to claim 30, further comprising bonding a second lower carbon fiber face sheet between said first lower carbon fiber face sheet and said carbon fiber mesh substrate.

32. The method according to claim 27, further comprising bonding a bottom surface, opposite said top surface, of said carbon fiber mesh substrate, to an apparatus using said solar array.

33. The method according to claim 32, wherein said apparatus is selected from the group consisting of a stratospheric platform, a spacecraft, and a land-based structure.

* * * * *